United States Patent Office 2,988,536
Patented June 13, 1961

2,988,536
PHENOL-ALDEHYDE CONDENSATION PROCESS
John M. Hine and John F. Miller, Seattle, Wash., assignors to The Borden Company, New York, N.Y., a corporation of New Jersey
No Drawing. Filed Aug. 21, 1956, Ser. No. 605,444
6 Claims. (Cl. 260—57)

This invention relates to the condensation products of phenol and aldehyde and to the process for making these products and, in particular, to the reaction and the reaction products of phenol and aldehyde resulting from the process having an introductory procedure comprising the reacting of the aldehyde and the phenol at a comparatively low temperature in the presence of a polyvalent metal compound to induce the formation of phenol-alcohol intermediates and a finishing procedure comprising the reacting of these phenol-alcohol intermediates in the presence of an alkaline catalyst to induce a high degree of chain formation.

The use of phenol-aldehyde resins in glue-mixes for plywood and the like and as a binder for fibrous materials such as wood chips in hardboard and cellulose fibers in wet-strength paper is at the present time generally accepted as these resins provide both a well-proven base, and in the light of other synthetic resins, a low-cost adhesive. Naturally, even though these resins are generally accepted, there are efforts to continually improve them and their handling characteristics such as to shorten the curing time, lower the curing temperature and to lengthen the storage life. More explicitly, earlier phenol-aldehyde resins possessed a comparatively long cure time which resulted in a decrease in the capacity of the plywood press and also a lowering of the quality of the plywood as there was excessive drying of the wood. This excessive drying resulted both in a face checking and a warping of the plywood. As is appreciated, the decrease in the capacity of the press made the unit cost of the plywood more expensive and the excessive drying of the plywood also raised the unit cost of the plywood as the dried plywood was less desirable for commercial usage and, therefore, could not demand quality prices.

With this knowledge of the prior resins and the limitations of the same the present inventors have invented a resin having a comparatively short cure time. In order to realize a resin possessing this desirable property, there is prepared a phenol-aldehyde condensation product by a two-step method comprising an induction step which favors an addition reaction between the phenol and the aldehyde so as to form a phenol-alcohol intermediate, and a finishing step which favors the condensation of the phenol-alcohol intermediate. With such a resin there is realized a short cure time as the resin is of a high molecular weight and it is believed that with only a slight degree of cross-linking passes over into the cured and infusible solid state. In addition, the resin possesses a long storage life and, therefore, is capable of being prepared in large batches and stored for an adequate period of time prior to use.

Accordingly, it is an object of the present invention to provide a phenol-aldehyde condensation product having a short reactivity time in passing from the soluble state in an alkaline aqueous solution to the insoluble state in the alkaline aqueous solution.

An additional object is to provide a resin having a long storage life as the same does not readily transfer from the liquid phase to the solid phase and thereby become unduly thick and hard to work.

An additional object is to provide a condensation product soluble in an aqueous alkaline solution and which product quickly sets under the application of heat to a final product insoluble in water, acetone, alcohol, acid and alkali.

An object is the provision of a method for making a phenol-aldehyde resin and which method is adaptable to a wide variation in time-temperature relations during the reaction period.

A further object is to provide a phenol-aldehyde condensation product which is soluble in an alkaline aqueous solution but upon heating for a short period of time becomes insoluble in the aqueous alkaline solution.

A further object of the present invention is the formation of phenol-aldehyde condensation products by a method which permits a wide variation in the phenol-aldehyde ratios and the aldehyde-alkali ratios.

Another object is the provision of a process for making a highly advanced liquid resin which is soluble in an aqueous-alkaline solution and which resin upon being neutralized is also soluble in ethanol.

A still further object is the provision of a method for making a phenol-aldehyde resin and which method eliminates the possibility of the Cannizzaro reaction occurring.

These and other objects and advantages of the invention are achieved by the employment of processes and procedures embodying the invention as illustrated in the following description.

Turning now to the invention, it is seen that the same comprises a phenol-aldehyde condensation product and the method for making said product. More particularly, even though highly condensed, this product is soluble in an alkaline aqueous solution and the neutralized solid product is soluble in ethanol. The method employed for making this product includes an induction procedure and a finishing procedure. In the induction procedure or step the phenol and aldehyde are heated together at a relatively low temperature in the presence of a polyvalent alkaline catalyst capable of yielding a polyvalent cation in an aqueous medium. We believe that during this step the predominant reaction is an addition reaction wherein the phenol and the aldehyde add to form a reaction solution comprising phenol-alcohol intermediates or transitory products. Of course, during this induction procedure, some of the phenol-alcohol intermediates condense into chains of short length. In the finishing procedure there is added to the reaction solution a strong alkaline catalyst such as an alkali metal hydroxide and, if necessary, additional aldehyde. The hydroxide is added to solubilize the condensation product thereby making it possible to have an aqueous resin solution and the aldehyde is added to adjust the phenol-aldehyde ratio to a predetermined value.

Also, in the finishing procedure or step, the resin solution is further heated to condense the reactants so that a viscosity in a specified range is realized. Upon reaching this viscosity, additional water may be added to the resin solution and the solution cooled and dropped. In the finishing step we consider that a reaction of considerable importance is the condensation reaction wherein phenol-alcohols formed in the induction step condense into chain-like structures of a comparatively long length. Naturally, with the addition of the aldehyde in this step, there is going to result the addition reaction between the phenol and the aldehyde and some cross-linking of the chains.

Turning now to the components for carrying out this process and for the making of the product, there are a number of suitable phenolic compounds represented by the group consisting of phenol, 3,5-xylenol and m-cresol. The phenol we normally use is phenol per se, a U.S.P. synthetic grade having a freezing point of about 40° C. More particularly, the phenol is used in a form referred to as 87% phenol and possesses approximately 13% water so that the same will be in an easily handled liquid form. The aldehyde is selected from those aldehydes in which the aldehyde group is the sole reactive group. Generally speaking, formaldehyde is the most widely used aldehyde because of its widespread availability and low cost. If formaldehyde be used, then it is most likely as formalin, i.e., an aqueous solution comprising about 37% formaldehyde, 1-7% methanol and the balance substantially water. In addition to these reactants there are employed alkaline compounds. For example, in the induction procedure there is employed a polyvalent inorganic alkaline catalyst selected from zinc and the alkaline earth group as typified by beryllium, magnesium, and calcium. More particularly, this alkaline catalyst may be an oxide or hydroxide of zinc, beryllium, magnesium, calcium, or other suitable compounds of these metals being capable of yielding in an aqueous medium a divalent cation. In the finishing procedure, there is employed an oxide or hydroxide of an alkali metal such as sodium hydroxide or potassium hydroxide.

Returning now to the method for making the phenol-aldehyde condensation product, it is feasible to employ in the induction procedure variations of the main procedure and, likewise, in the finishing procedure it is possible to vary the broad procedure. To more fully bring forth these variations we herewith present various induction procedures and finishing procedures.

INDUCTION PROCEDURE A

In this induction procedure the phenol, aldehyde and an inorganic alkaline catalyst having a combined polyvalent metal of the above-identified group are refluxed in an aqueous medium at approximately 100° C. for a specified period of time to form a phenol-alcohol reaction solution. Upon completion of the refluxing step, this solution is then cooled to a temperature below about 45° C.

INDUCTION PROCEDURE B

This procedure is very similar to Procedure A in that the phenol, aldehyde and the inorganic alkaline catalyst having a combined polvalent metal of the above-identified group, such as zinc oxide or calcium oxide, are refluxed at approximately 100° C. for a specified period of time to make a phenol-alcohol reaction solution. However, during the reflux period there is added from time to time small increments of the inorganic alkaline catalyst to re-establish the pH of the solution near the original value. (This is necessitated because during the reflux period, if no additional charges of the catalyst are added, the pH drifts slowly, in the case of lime, from the original value of approximately 7.3-7.6 to 5.2-5.6 and, in the case of zinc oxide, which is a weaker base than the calcium oxide, from the original pH of about 5.2 to a lower value.) Upon completing the refluxing step the mixture is cooled to a temperature below about 45° C.

INDUCTION PROCEDURE C

In this procedure the phenol, aldehyde and inorganic alkaline catalyst of the above-identified group are refluxed at approximately 100° C. for a predetermined period of time to form a phenol-alcohol reaction solution. Next, the solution is heated and the water distilled as a binary boiling mixture of phenol and water. This mixture may be crudely separated into the phenol and the water either by phase separation, i.e., allowing the same to stand for a sufficient period so as to separate into the two solutions, a phenol rich solution and a water rich solution, or else in the distillation step by passing the mixture through a fractionating column wherein the two components are separated. The phenol rich solution is returned to the phenol-aldehyde reaction solution and said mixture heated to a temperature of about 130° C. for a specified period of time. Then the mixture is permitted to cool to a temperature below about 45° C. and the water in the distillate reunited with the mixture.

INDUCTION PROCEDURE D

In this procedure phenol and an inorganic alkaline catalyst of the above identified group are heated to a reaction temperature above the boiling point of water, viz., a temperature of 130° C. or above. This mixture of phenol and lime is well agitated and an aldehyde added at a constant rate either by a dropwise method whereby the aldehyde is permitted to drop onto the surface of the mixture or by a subsurface technique whereby the aldehyde is delivered below the surface of the mixture at the base of the reaction vessel. The rate of aldehyde delivery is adjusted so as to maintain the specified temperature of the mixture which in turn is supported by external heating. Any water in the components, i.e., 87% phenol and formalin (37% formaldehyde), and water resulting from the reaction distill as a binary boiling mixture of water and phenol. This mixture is separated into the phenol and water either by phase separation of the distillate or by fractional distillation of the distillate, and the phenol in the distillate is returned to the reaction mixture. When all of the aldehyde has been added the reaction mixture is held at the specified temperature for a desired period of time (dwell time) and then cooled to about 45° C. or less. Thereafter, the water in the distillate is recombined with the reaction mixture.

Upon completing the induction procedure the reaction is then further reacted in the presence of appropriate agents to advance and condense the phenol-alcohols into usable resins. This advancement or condensation is referred to as the finishing procedure. As there are a number of variations of the induction procedures there are also a number of variations of the finishing procedures.

FINISHING PROCEDURE E

To the cool phenol-alcohol reaction solution (temperature of 45° C. or less) there may be added additional aldehyde to adjust the overall ratio of the phenol to the aldehyde to a value in the desired range, and there is added an alkali such as 50% aqueous sodium hydroxide solution to adjust the pH to a value in the range of 9.1-9.3. Then the alkaline reaction solution is condensed at a temperature of about 90° C. (or, this condensation step may be preceded by a short, two to ten minute, reflux step at a higher temperature) until a desired viscosity is realized, normally in the range of Gardner-Holdt "V" to "Z-3," 884-4130 centipoises at 25° C. Upon reaching the desired viscosity the temperature of the mixture is decreased to a value near 80° C. and the continuous addition of the aqueous caustic solution initiated. The rate of addition is dependent upon maintaining a constant viscosity at the condensing temperature of approximately 80° C. Upon completing the addition of the aqueous caustic solution the resin is ready for cooling and dropping.

FINISHING PROCEDURE F

To the cool phenol-alcohol reaction solution there may be added additional aldehyde to increase the phenol to aldehyde ratio to a value in the desired range and the temperature of said reaction solution is then raised to approximately 80° C. At this temperature the aqueous caustic solution such as 50% sodium hydroxide is continuously added thereto. Again the rate of the caustic addition is determined by the viscosity, i.e., the viscosity of the solution is maintained substantially constant by the added caustic. Upon completion of the caustic addition and the attaining of the desired viscosity the resin solution is cooled and dropped.

As is seen from the above, the difference between the Procedures E and F is that in Procedure E the pH of the reaction mixture is adjusted to a value in the range of approximately 9.1–9.3 and the condensation step takes place with the continuous addition of caustic alkali while in Procedure F the pH of the reaction mixture is not initially raised to a high value but the addition of the caustic alkali is continuous throughout the condensation step so as to continually raise the pH of the solution. In both procedures the pH's of the final resin solutions are substantially identical.

FINISHING PROCEDURE G

There is a third finishing procedure, wherein the aldehyde to phenol ratio in the cooled phenol-alcohol reaction solution, at a temperature of 45° C. or less, may be adjusted to the desired value by the addition of adehyde and then the reaction solution raised to a temperature of approximately 80° C. In this procedure the addition of an inorganic alkaline catalyst such as 50% sodium hydroxide is accomplished in a stepwise manner instead of in a continuous manner, and after each addition of the catalyst the reaction mixture is recondensed to a specified Gardner-Holdt viscosity. Upon the addition of the catalyst and with the attaining of the desired viscosity the reaction mixture is cooled and dropped for shipment.

As is well known at this time the addition of the strong inorganic alkaline catalyst as sodium hydroxide or potassium hydroxide in small quantities, either continuously or step wise, to the reaction mixture is important as this type of addition decreases the possibility of the Cannizzaro reaction taking place, i.e., the free aldehyde in the presence of the alkali is converted to both methyl-alcohol and formic acid so as to eliminate the aldehyde and thereby prevent the phenol-aldehyde condensation reaction occurring. This is more clearly brought forth by Roger Adams in his book, "Organic Reactions," volume II, Third Edition, published by John Wiley & Sons, Inc., New York, N.Y., 1944, pages 98 and 99, viz., the Cannizzaro reaction is particularly liable to take place when the concentration of alkali is greater than 10% in the presence of free aldehyde or what is substantially equal to a 3.0 normal alkaline solution.

The applicants in their method have circumvented the possibility of the Cannizzaro reaction occurring by resorting to the two-step procedure. More particularly, in the induction procedure the possibility of the Cannizzaro reaction occurring is eliminated in a dual-fold manner as only a very small concentration of an alkaline catalyst is employed, e.g., one-tenth of one percent by weight, and also the catalyst is a difficultly soluble alkaline catalyst, e.g., an inorganic alkaline material having a combined polyvalent metal of the above identified group such as beryllium, magnesium, and calcium. And in the finishing procedure, even though there is employed a strong caustic alkali such as sodium hydroxide or potassium hydroxide, the possibility of a Cannizzaro reaction occurring is again eliminated in a two-fold manner. That is, the concentration of the free aldehyde is very low as most of the aldehyde has reacted with the phenol to form a phenol-alcohol, so, therefore, there is little, if any, aldehyde present to form methyl alcohol and formic acid. Also, as the strong caustic alkali is added, either continuously or in a stepwise manner, the concentration of the alkali is at no time very high.

The role of the strong alkali catalyst in the finishing procedure is a dual one in that the presence of the alkali acts to catalyze the condensation reaction between the phenol-alcohols and the free aldehyde present to form condensation products from these phenol-alcohols and also the alkali acts to solubilize said condensation products so that the same are soluble in the aqueous alkaline solution. The amount of alkali added, either continuously or by steps, is determined by the desired control over the progression of the reaction as evidenced by the viscosity, solubility and extent of the Cannizzaro reaction.

The induction procedures, the finishing procedures, the combinations of these procedures into the various processes including the different ratios of formaldehyde to phenol, and the range of alkali metal hydroxide usage are more fully presented in the following examples. It is to be understood that the examples are by way of illustration only and are not to be interpreted as a limitation of the invention.

*Example No. I*

Procedure:

Phenol (added as 87% phenol)—
    Phenol (100%)_____parts__ 94
    Water _____do____ 14
37% formaldehyde_____do____ 60.8
Lime, based on weight of phenol_____percent__ 0.184
Water based on weight of phenol,
    to slurry lime_____do____ 0.184

Mix and reflux at 100° C. for 86 minutes.
Cool to about 25° C.
Add:

37% formaldehyde _____parts__ 100
50% NaOH _____do____ 26.2

Over a 50 minute period raise the temperature to about 90° C.
Cool immediately so as to be at 84° C. in 5 minutes, Gardner viscosity is Z–1 (2700 centipoises at 25° C.).
Add:

50% NaOH _____parts__ 40.2
Water _____do____ 52.5

The resin is further condensed and the temperature permitted to drop from about 84° C. to about 76° C. The variation of time, temperature, and viscosity for the condensation period is as follows:

| Time, Minutes | Temperature, ° C. | Viscosity | |
|---|---|---|---|
| | | Gardner-Holdt | Centipoises at 25° C. |
| 0 | 84 | (charged caustic and water) | |
| 25 | 80 | E | 125 |
| 155 | 84 | G+ | 165+ |
| 230 | 84 | P | 400 |
| 285 | 80 | T+ | 550+ |
| 300 | 80 | U+ | 627+ |
| 335 | 76 | V+ | 884+ |

Add 22.4 parts of water.
Cool and discharge.
Final resin: Solids, 40%; pH, 12.5; percent caustic, 35%; phenol:formaldehyde ratio, 1:1.98 (mole basis); and a viscosity of about 435 centipoises at 25° C.

*Example No. II*

Procedure:

Phenol (added as 87% phenol)—
    Phenol (100%)_____parts__ 94
    Water _____do____ 14
37% formaldehyde _____do____ 31
Lime, based on weight of phenol_____percent__ 0.184
Water based on weight of phenol,
    to slurry lime_____do____ 0.184

Mix and reflux at 100° C. for 17 minutes, pH 7.30.
Cool to about 25° C.
Add:

37% formaldehyde _____parts__ 129.4
50% NaOH _____do____ 26.2

Raise the temperature of the resin solution as follows (the viscosity for the time is presented):

| Time, Minutes | Temperature, °C. | Viscosity | |
|---|---|---|---|
| | | Gardner-Holdt | Centipoises at 25° C. |
| 0 | 25 | (charged formalin and water) | |
| 25 | 100 | | |
| 30 | 100 | | |
| 40 | 95 | B | 65 |
| 60 | 90 | D | 100 |
| 75 | 95 | H | 200 |
| 85 | 95 | S+ | 500+ |

Add:

50% NaOH _____parts__ 40.2
Water _____do____ 52.5

The resin is further condensed by heating for a prolonged period of time. The time, temperature and viscosity for the condensation period are as follows:

| Time, Minutes | Temperature, °C. | Viscosity | |
|---|---|---|---|
| | | Gardner-Holdt | Centipoises at 25° C. |
| 90 | 95 | B+ | 65+ |
| 140 | 96 | E+ | 125+ |
| 180 | 84 | H | 200 |
| 225 | 84 | O | 370 |
| 270 | 82 | T | 550 |
| 295 | 83 | V | 884 |
| 305 | 79 | V+ | 884+ |

Add 22.4 parts of water.
Cool and discharge.
Final resin: Solids, 40%; pH, 12.5; caustic, 35%; phenol: formaldehyde ratio, 1:1.98 (mole basis); and a viscosity of above 450 centipoises at 25° C.

*Example No. III*

Procedure:

Phenol (added as 87%)—
   Phenol (100%)_____parts__ 94
   Water _____do____ 14
37% formaldehyde _____do____ 160.8
Lime, based on weight of phenol_____percent__ 0.10
Water based on weight of phenol,
   to slurry lime_____do____ 0.10

Mix and reflux at about 100° C. for approximately 210 minutes. The time, temperature, pH, and free formaldehyde during the refluxing are:

| Time, Minutes | Temperature, °C. | pH | Formaldehyde (Free) (Percent) |
|---|---|---|---|
| 0 | 100 | 7.05 | 21 |
| 50 | 100 | 6.65 | |
| 210 | 100 | 5.60 | 4.2 |

Cool to about 25° C.
Add:

50% NaOH _____parts__ 26.2

In a time period of approximately 75 minutes raise the temperature to about 95° C. and a viscosity of D+, 100+ centipoises at 25° C.
Hold at 95° C. for 15 minutes and the viscosity is Gardner-Holdt S, 500 centipoises at 25° C.
Add:

50% aqueous NaOH _____parts__ 40.2
Water _____do____ 52.5

The resin is condensed and the time, temperature, and viscosity are, during the condensation period, as follows:

| Time, Minutes | Temperature, °C. | Viscosity | |
|---|---|---|---|
| | | Gardner-Holdt | Centipoises at 25° C. |
| 0 | 95 | (charged caustic and water) | |
| 13 | 90 | B+ | 65+ |
| 145 | 94 | E+ | 125+ |
| 230 | 80 | M+ | 320+ |
| 305 | 80 | T+ | 550+ |
| 320 | 80 | U+ | 627+ |
| 335 | 78 | V+ | 884+ |

Add 22.4 parts of water.
Cool and discharge.
Final resin: Solids, 40%; pH, 12.5; caustic, 35%; phenol: formaldehyde ratio, 1:1.98 (mole basis); and a viscosity of about 392 centipoises at 25° C.

*Example No. IV*

Procedure:

Phenol (as 91% phenol)—
   Phenol (100%)_____parts__ 94
   Other phenolic components _____do____ 9.2
Water _____do____ 14.1
37% formaldehyde _____do____ 160.8
Lime, based on weight of phenol_____percent__ 0.184
Water based on weight of phenol,
   to slurry lime_____do____ 0.184
pH of phenol-formalin solution_____ 4.15
pH of phenol-formalin solution
   after addition of lime _____ 7.55

Mix and heat to reflux, 100° C., in 23 minutes. Hold at reflux for 4 hours. The time, temperature, pH, cloud point, and free formaldehyde during the reflux period are as follows:

| Time, Minutes | Temperature, °C. | pH | Cloud Point, °C. | Free CH₂O, Percent |
|---|---|---|---|---|
| 0 | 25 | 7.55 | | 22 |
| 23 | 100 | 7.35 | | 19 |
| 58 | 100 | 6.80 | | 14 |
| 74 | 100 | 6.65 | | 13 |
| 128 | 100 | 6.30 | 11 | 10 |
| 173 | 100 | 6.30 | 42 | 9 |
| 203 | 100 | 6.30 | 63 | 9 |
| 248 | 100 | 6.40 | 100 | 8 |
| 263 | 100 | 6.30 | | 7 |

At the end, the content of free formaldehyde has ceased falling rapidly.
Cool the resin solution to room temperature.
Add:

50% NaOH _____parts__ 66.4
Water _____do____ 52.5

The relationship of time, temperature, viscosity and caustic added as above indicated is presented as follows:

| Time, Minutes | Temperature, °C. | Fractional part of the total caustic added | Viscosity | |
|---|---|---|---|---|
| | | | Gardner | Centipoises at 25° C. |
| 0 | 25 | 0 | | |
| 15 | 78 | 0.15 | | |
| 55 | 92 | 0.26 | U− | 627− |
| 65 | 92 | 0.60 | J | 250 |
| 80 | 91 | 1.00 | D | 100 |
| 145 | 93 | 1.00 | G+ | 165 |
| 168 | 93 | 1.00 | L | 300 |
| 212 | 79 | 1.00 | R | 470 |
| 282 | 80 | 1.00 | V+ | 884 |

Add 22.4 parts of water to the resin.
Cool and discharge.

Final resin: Solids, 40%; pH, 12.5; caustic, 35%; phenol: formaldehyde ratio, 1:1.98 (mole basis); and a viscosity of about 538 centipoises at 25° C.

Example No. V

Procedure:

Phenol (added as 87% phenol)—
  Phenol (100%) _____ parts__ 94
  Water _____ do____ 14
37% formaldehyde _____ do____ 60.8
Zinc oxide, based on weight of phenol__percent__ 0.100
Water based on weight of phenol,
  to slurry of zinc oxide _____ do____ 0.100

Mix and reflux at 100° C. for six and three-fourths hours. The relationship of time, temperature, pH and free formaldehyde during the reflux period is as follows:

| Time, Minutes | Temperature, °C. | pH | Free Formaldehyde, Percent |
|---|---|---|---|
| 0 | 25 | 5.0 | 13 |
| 25 | 100 | | |
| 40 | 100 | 5.52 | |
| 170 | 100 | 5.68 | |
| 430 | 100 | 5.30 | 1.1 |

Cool to about 25° C.
Add:

37% formaldehyde _____ parts__ 100
50% aqueous NaOH (1st addition)_____ do____ 26.2

The time, temperature and viscosity characteristics of the resin solution after the first addition of caustic are as follows:

| Time, Minutes | Temperature, °C. | Viscosity | |
|---|---|---|---|
| | | Gardner | Centipoises at 25° C. |
| 0 | 20 | | |
| 30 | 75 | | |
| 55 | 76 | A | 50 |
| 155 | 77 | F— | 140— |
| 208 | 77 | O | 370 |

Add:

50% aqueous NaOH (2nd addition) _____ parts__ 40.2
Water _____ do____ 52.5

| Time, Minutes | Temperature, °C. | Viscosity | |
|---|---|---|---|
| | | Gardner | Centipoises at 25° C. |
| 228 | 95 | | |
| 295 | 95 | F— | 140— |
| 385 | 82 | O | 370 |
| 490 | 76 | V+ | 884+ |

Add 22.4 parts of water.
Cool and discharge.
Final resin: Solids, 40%; pH, 12.5; caustic, 35%; phenol: formaldehyde ratio, 1:1.98 (mole basis); and a viscosity of about 495 centipoises at 25° C.

Example No. VI

Procedure:

Phenol (added as 87% phenol)—
  Phenol (100%) _____ parts__ 94
  Water _____ do____ 14
37% formaldehyde _____ do____ 60.8
Zinc oxide, based on weight of phenol__percent__ 0.200
Water based on weight of phenol,
  to slurry of zinc oxide_____ do____ 0.500

Mix and reflux at 100° C. for 8 hours and 40 minutes. The time, pH and free formaldehyde analysis of the resin solution is as follows:

| Time, Minutes | pH | Free Formaldehyde, Percent |
|---|---|---|
| 0 | 5.5 | 13 |
| 520 | 6.2 | 1.2 |

Cool to 25° C.
Add:

37% formaldehyde _____ parts__ 100
50% aqueous NaOH _____ do____ 8.8

Heat the mixture in a period of about 27 minutes to reflux temperature. Upon reaching the reflux temperature let the temperature decrease to 85° C. in 20 minutes, viscosity is "S" or 500 centipoises at 25° C.
Add continuously over a four hour period:

50% aqueous sodium hydroxide _____ parts__ 57.6
Water _____ do____ 76

The relationship between time, temperature, viscosity and caustic added during this period is as follows:

| Time, Minutes | Temperature, °C. | Fractional Part of the Total Caustic Added | Viscosity | |
|---|---|---|---|---|
| | | | Gardner | Centipoises at 25° C. |
| 0 | 85 | 0.00 | | |
| 15 | 79 | 0.087 | U+ | 627+ |
| 40 | 80 | 0.304 | U+ | 627+ |
| 67 | 80 | 0.520 | S | 500 |
| 120 | 85 | 0.738 | J | 250 |
| 210 | 80 | 0.870 | L | 300 |
| 240 | 81 | 1.000 | O | 370 |
| 300 | 83 | 1.000 | U | 627 |

Cool and discharge.
Final resin: Solids, 40%; pH, 12.5; caustic, 35%; phenol-formaldehyde ratio, 1:1.98 (mole basis); and a viscosity of about 1836 centipoises at 25° C.

Example No. VII

Procedure:

Phenol (added as 87% phenol)—
  Phenol (100%) _____ parts__ 94
  Water _____ do____ 14
37% formaldehyde _____ do____ 160.8
Lime, based on weight of phenol_____ percent__ 0.10
Water based on weight of phenol,
  to slurry lime _____ do____ 0.10
pH of phenol-formalin solution _____ 4.40
pH of phenol-formalin solution
  after addition of lime _____ 7.30

Mix and heat to reflux (100° C.) in 33 minutes and reflux for two-and-one-fourth hours.
During reflux add four charges of lime. The following schedule illustrates the relationship between the time, temperature, pH and free formaldehyde:

| Time, Minutes | Temperature, °C. | pH | Free Formaldehyde, Percent | Lime Additions, Percent (based on phenol) |
|---|---|---|---|---|
| 0 | 21 | 7.30 | 21 | |
| 33 | 100 | | | |
| 38 | 100 | | | 0.10 |
| 53 | 100 | 6.80 | | |
| 63 | 100 | | | 0.10 |
| 65 | 100 | 7.20 | | |
| 93 | 100 | 6.85 | | |
| 96 | 100 | | | 0.10 |
| 99 | 100 | 7.10 | | |
| 128 | 100 | | | 0.10 |
| 133 | 100 | 7.10 | | |
| 168 | 90 | 7.00 | | |
| 203 | 27 | | 2.5 | |

Add:

50% aqueous sodium hydroxide _____parts__ 26.4
Over a period of about 65 minutes raise the temperature to nearly 95° C., viscosity is Z–1, 2700 centipoises at 25° C.

Add:

50% aqueous sodium hydroxide _____parts__ 40
Water _____do____ 52.5

The time, temperature and viscosity relationships are as follows:

| Time, Minutes | Temperature, °C. | Viscosity | |
|---|---|---|---|
| | | Gardner | Centipoises at 25° C. |
| 0 | 95 | | |
| 35 | 94 | G+ | 165+ |
| 55 | 90 | J | 250 |
| 95 | 84 | P | 400 |

Cool overnight, complete condensation as follows:

| Time, Minutes | Temperature, °C. | Viscosity | |
|---|---|---|---|
| | | Gardner | Centipoises at 25° C. |
| 0 | 22 | Q– | 435– |
| 90 | 73 | S | 500 |
| 135 | 80 | U+ | 627+ |
| 155 | 80 | V+ | 884+ |

Add 22.4 parts of water.
Cool and discharge.
Final resin: Solids, 40%; pH, 12.5; caustic, 35%; phenol:formaldehyde ratio, 1:1.98 (mole basis); and a viscosity of 575 centipoises at 25° C.

*Example No. VIII*

Procedure:

Phenol (added as 87% phenol)—
    Phenol (100%) _____parts__ 94
    Water _____do____ 14
37% formaldehyde _____do____ 160.8
Zinc oxide, based on weight of phenol__percent__ 0.10
Water based on weight of phenol,
    to slurry lime _____do____ 0.10

Mix and heat to reflux (100° C.). The time, temperature, pH, free formaldehyde and cloud point are as follows:

| Time, Minutes | Temperature, °C. | pH | Free Formaldehyde, Percent | Cloud Point, °C. |
|---|---|---|---|---|
| 0 | 25 | 5.2 | | |
| 40 | 100 | | | |
| 67 | 100 | 5.62 | 21 | |
| 160 | 100 | 4.20 | 17 | |
| 227 | 100 | 3.95 | 15 | |
| 520 | 100 | 3.88 | 12 | 47.5 |

Add 0.20% zinc oxide based on weight of phenol.

| Time, Minutes | Temperature, °C. | pH | Free Formaldehyde, Percent | Cloud Point, °C. |
|---|---|---|---|---|
| 520 | 100 | 5.00 | | |
| 655 | 100 | 4.45 | 8.1 | 100 |
| 745 | 100 | 4.45 | 6.5 | |

Cool to room temperature.
Add:

50% aqueous sodium hydroxide _____parts__ 13.3

Heat the resin solution as follows:

| Time, Minutes | Temperature, °C. | Viscosity | |
|---|---|---|---|
| | | Gardner | Centipoises at 25° C. |
| 0 | 25 | | |
| 74 | 94 | D | 100 |
| 83 | 90 | I | 225 |
| 91 | 94 | O+ | 370+ |

Add:

50% aqueous sodium hydroxide _____parts__ 40
Water _____do____ 52.5

| Time, Minutes | Temperature, °C. | Viscosity | |
|---|---|---|---|
| | | Gardner | Centipoises at 25° C. |
| 0 | 89 | | |
| 64 | 97 | F | 140 |
| 98 | 86 | I | 225 |
| 126 | 92 | M | 320 |
| 179 | 95 | V+ | 884+ |

Add:

22.4 parts of water.
Cool and discharge.

Final resin: Solids, 40%; pH, 12.5%; caustic, 35%; phenol:formaldehyde ratio, 1:1.98 (mole basis); and a viscosity of about 480 centipoises at 25° C.

*Example No. IX*

Procedure:

Phenol (added as 87% phenol)—
    Phenol (100%) _____parts__ 94
    Water _____do____ 14
37% formaldehyde _____do____ 31.2
Lime, based on weight of phenol _____percent__ 0.184
Water, based on weight of phenol, to slurry
    lime _____percent__ 0.184

Mix and heat to reflux, reflux for seventeen minutes, pH of phenol, formalin and lime is about 7.50.
Over a period of seventy-five minutes heat to 160° C., hold at this temperature by means of a downdraft condenser; as temperature rises collect phenol-water binary mixture.
Hold at 160° C. for one hour.
Cool to room temperature.
Return distillate.
Add:

37% formaldehyde _____parts__ 129.3
50% aqueous sodium hydroxide _____do____ 26.4

The relationship between time, temperature and viscosity upon the above addition is as follows:

| Time, Minutes | Temperature, °C. | Viscosity | |
|---|---|---|---|
| | | Gardner | Centipoises at 25° C. |
| 0 | 25 | | |
| 20 | 100 | E+ | 125+ |
| 40 | 90 | W | 1,070 |

Add:

| | parts |
|---|---|
| 50% aqueous sodium hydroxide | 40 |
| Water | 52.5 |

| Time, Minutes | Temperature, °C. | Viscosity | |
|---|---|---|---|
| | | Gardner | Centipoises at 25° C. |
| 60 | 86 | E | 125 |
| 73 | 91 | F | 140 |
| 130 | 84 | O | 370 |
| 180 | 76 | U | 627 |
| 210 | 71 | V+ | 884+ |

Add: 22.4 parts of water.
Cool and discharge.
Final resin: Solids, 40%; pH, 12.5; caustic, 35%; phenol:formaldehyde ratio, 1:1.98 (mole basis); and a viscosity of 431 centipoises at 25° C.

*Example No. X*

Procedure:

Phenol (added as 87% phenol)—

| | parts |
|---|---|
| Phenol (100%) | 94 |
| Water | 14 |
| 37% formaldehyde | 60.8 |

Zinc oxide, based on weight of phenol __percent__ 0.10
Water, based on weight of phenol, to slurry zinc oxide __percent__ 0.10
Mix, pH of solution 5.0, and free formaldehyde percent__ 13

Mix and over a time period of about 22 minutes heat to reflux; reflux for approximately 410 minutes at 100° C. By means of a downdraft condenser permit the temperature to rise to 130° C. over a time period of 250 minutes, and retain the distillate composed of a phenol-water binary mixture. pH of resin 5.52 and free formaldehyde 1.2%.

Combine the resin and distillate, and cool to 25° C.
Add:

| | parts |
|---|---|
| 37% formaldehyde | 100 |
| 50% aqueous sodium hydroxide | 26.4 |

Heat according to the following schedule:

| Time, Minutes | Temperature, °C. | Viscosity | |
|---|---|---|---|
| | | Gardner | Centipoises at 25° C. |
| 0 | 25 | | |
| 25 | 78 | | |
| 42 | 75 | E | 125 |
| 88 | 74 | O— | 370— |

Add:

| | parts |
|---|---|
| 50% aqueous sodium hydroxide | 40 |
| Water | 52.5 |

| Time, Minutes | Temperature, °C. | Viscosity | |
|---|---|---|---|
| | | Gardner | Centipoises at 25° C. |
| 120 | 92 | B+ | 65 |
| 240 | 83 | I+ | 225 |
| 285 | 80 | P | 400 |
| 342 | 77 | T | 550 |
| 405 | 76 | V+ | 884+ |

Add 22.4 parts water.
Cool and discharge.
Final resin: Solids, 40%; pH, 12.5; caustic, 35%; phenol:formaldehyde ratio, 1:1.98 (mole basis); and a viscosity of 470 centipoises.

*Example No. XI*

Procedure:

Phenol (added as 87% phenol)—

| | parts |
|---|---|
| Phenol (100%) | 94 |
| Water | 14 |

Heat phenol to about 130° C. to remove water, save the distillate.

Lime, based on weight of phenol __percent__ 0.100

Over a two-and-one-fourth hour period add 37% formaldehyde __parts__ 60.8 to the phenol-lime mixture at about 130° C. The formaldehyde is charged through an inlet tube whose inlet opening is below the surface of the phenol. The binary-mixture distillate of phenol and water is phase separated with the phenol being returned to the reaction mixture and the water being saved. Upon completing the addition of the formalin all of the water is added to the reaction mixture and the mixture cooled to 25° C.

Add:

| | parts |
|---|---|
| 37% formaldehyde | 100 |
| 50% aqueous sodium hydroxide | 26.4 |

Over a one-half hour period heat to reflux, 100° C., and reflux for ten minutes. Cool to 90° C. and hold at this temperature for about 32 minutes or until a viscosity of L, 300 centipoises at 25° C., is reached.

Add:

| | parts |
|---|---|
| 50% aqueous sodium hydroxide | 40 |
| Water | 52.5 |

The relationship between time, temperature and viscosity is as follows:

| Time, Minutes | Temperature, °C. | Viscosity | |
|---|---|---|---|
| | | Gardner | Centipoises at 25° C. |
| 0 | 88 | | |
| 18 | 96 | B | 65 |
| 58 | 95 | F | 140 |
| 153 | 81 | J | 250 |
| 338 | 85 | T | 550 |

Add:

Water __parts__ 22.4

Condense as follows:

| Time, Minutes | Temperature, °C. | Viscosity | |
|---|---|---|---|
| | | Gardner | Centipoises at 25° C. |
| 0 | 83 | J | 250 |
| 66 | 82 | K | 275 |
| 126 | 82 | Q | 435 |

Cool and discharge.
Final resin: Solids, 40%; pH, 12.5; caustic, 35%; phenol:formaldehyde ratio, 1:1.98 (mole basis); and a viscosity of about 515 centipoises at 25° C.

*Example No. XII*

Procedure:

Phenol (added as 87% phenol)—

| | parts |
|---|---|
| Phenol (100%) | 94 |
| Water | 14 |
| 37% formaldehyde | 142 |

Zinc oxide, based on weight of phenol __percent__ 0.1
Water, based on weight of phenol, to slurry zinc oxide __percent__ 0.1

Reflux at 100° C. for six hours.

The relationship during reflux is:

| Time, Minutes | pH | Free Formaldehyde (percent) |
|---|---|---|
| 0 | 6.0 | |
| 120 | 4.1 | |
| 360 | 3.62 | 13 |

Cool to 25° C.
Add:

| | | |
|---|---|---|
| 37% formaldehyde | parts | 81 |
| 50% aqueous sodium hydroxide | do | 92 |
| Water | do | 45 |

The water and caustic are continuously added to the resin solution, the solution heated, and the relationship between time, temperature, free caustic and viscosity is as follows:

| Time, Minutes | Temperature, °C. | Fraction Caustic | Viscosity Gardner | Centipoises at 25° C. |
|---|---|---|---|---|
| 0 | 25 | 0 | | |
| 60 | 90 | ¹1.00 | V+ | 884+ |
| 120 | 79 | | W+ | 1,070+ |

¹ (50% sodium hydroxide added.)

Cool and discharge.
Final resin: solids, 42.7%; pH, 12.8; caustic, 49%; phenol:formaldehyde ratio, 1:2.75 (mole basis); and a viscosity of about 1872 centipoises at 25° C.

*Example No. XIII*
Procedure:

| | | |
|---|---|---|
| 3,5-xylenol | parts | 122 |
| 37% formaldehyde | do | 100 |
| Zinc oxide, based on weight of xylenol | percent | 0.1 |
| Water, based on weight of xylenol, to slurry zinc oxide | percent | 0.1 |

Reflux at 100° C. for fifteen minutes.
Cool to 25° C.
Add:

| | | |
|---|---|---|
| 50% aqueous sodium hydroxide | parts | 39 |
| Water | do | 64 |

Condense at 70° C. for two-and-one-half hours; viscosity is T or 550 centipoises.
Cool and discharge.
Final resin: solids, 46.9%; pH, 11.4; caustic, 16%; xylenol:formaldehyde ratio, 1:1.25 (mole basis); and a viscosity of about 827 centipoises at 25° C.

*Example No. XIV*
Procedure:

| | | |
|---|---|---|
| Phenol (added as 87% phenol)— | | |
| Phenol (100%) | parts | 94 |
| Water | do | 14 |
| 37% formaldehyde | do | 142 |
| Zinc oxide, based on weight of phenol | percent | 0.1 |
| Water, based on weight of phenol, to slurry zinc oxide | percent | 0.1 |

Reflux at 100° C. for six hours.
The relationship during reflux of the time, pH and free formaldehyde is as follows:

| Time, Minutes | pH | Free Formaldehyde (Percent) |
|---|---|---|
| 0 | 6.0 | |
| 120 | 4.1 | |
| 360 | 3.62 | 13 |

Cool to 25° C.
Add:

| | | |
|---|---|---|
| 37% formaldehyde | parts | 18.6 |
| 50% aqueous sodium hydroxide | do | 16.8 |

The caustic is continuously added to the resin solution, the solution heated, and the relationship between time, temperature, free caustic and viscosity is as follows:

| Time, Minutes | Temperature, °C. | Free Caustic | Viscosity Gardner | Centipoises at 25° C. |
|---|---|---|---|---|
| 0 | 85 | 0 | | |
| 65 | 87 | 0.50 | A | 50 |
| 111 | 86 | 0.85 | E | 125 |
| 130 | | 1.00 | M | 320 |
| 250 | 80 | | V— | 884 |

Cool and discharge.
Final resin: solids, 48.1%; pH, 9.78; caustic, 17.9%; phenol:formaldehyde ratio, 1:1.98 (mole basis); and a viscosity of 1442 centipoises.

*Example No. XV*
Procedure:

| | | |
|---|---|---|
| Phenol (added as 87% phenol)— | | |
| Phenol (100%) | parts | 94 |
| Water | do | 14 |
| 37% formaldehyde | do | 142 |
| Zinc oxide, based on weight of phenol | percent | 0.1 |
| Water, based on weight of phenol, to slurry zinc oxide | percent | 0.1 |

Reflux at 100° C. for six hours.
The relationship during reflux of the time, pH and free formaldehyde is as follows:

| Time, Minutes | pH | Free Formaldehyde (percent) |
|---|---|---|
| 0 | 6.0 | |
| 120 | 4.1 | |
| 360 | 3.62 | 13 |

Cool to 25° C.
Add:

| | | |
|---|---|---|
| 37% formaldehyde | parts | 18.6 |
| 50% aqueous sodium hydroxide | do | 37.6 |

The caustic is continuously added to the resin solution, the solution heated, and the relationship between time, temperature, free caustic and viscosity is as follows:

| Time, Minutes | Temperature, °C. | Free Caustic | Viscosity Gardner | Centipoises at 25° C. |
|---|---|---|---|---|
| 0 | 84 | 0 | | |
| 66 | 85 | .69 | B | 65 |
| 108 | 86 | 1.00 | H | 200 |
| 203 | 79 | | W | 1,070 |

Cool and discharge.
Final resin: solids, 47.2%; pH, 10.55; caustic, 40%; phenol:formaldehyde ratio, 1:1.98 (mole basis); and a viscosity of about 769.

*Example No. XVI*
Procedure:

| | | |
|---|---|---|
| m-Cresol | parts | 108 |
| Formalin | do | 168 |
| Lime, based on weight of m-cresol | percent | 0.10 |
| Water, equal in weight to lime to slurry same | percent | 0.10 |

The above mixture is heated to the refluxing temperature and refluxed for about seventeen minutes, and then cooled to about 25° C.
Add:

Sodium hydroxide, 50% aqueous medium __parts__ 26.4
Water _____do____ 52.6

The resin mixture is condensed at a temperature in the range of 80–85° C. until a Gardner-Holdt viscosity of "F" or 140 centipoises at 25° C.
The resin mixture is further condensed at about 80° C. until the viscosity is Gardner-Holdt "W" or 1070 centipoises at 25° C.
Add: 22.4 parts of water.
Cool to about 25° C. and discharge.
Final resin: pH of 12.75, and a viscosity of 575 centipoises 25° C.

From these above presented examples, it is seen that there may be a large variation in the ratios of the various components to the phenol. For example, the molar ratio of phenol to formaldehyde varies from about 1:1.25 to 1:2.75 and the molar ratio of phenol to caustic varies from approximately 1:0.15 to 1:1.15. Also, it is seen that xylenol and m-cresol may be used equally as well as phenol to give the condensation products.

As a guide-post for indicating the stage to which our resin is advanced, we herewith refer to the article by L. H. Baekland, "The Synthesis, Constitution and Uses of Bakelite," published in "The Journal of Industrial and Engineering Chemistry," vol. I, No. 3, March 1909, pages 149–155 wherein there is defined the three stages of a phenolic resin.

*A-stage, initial condensation product.*—"At ordinary temperatures, may be liquid, or viscous or pasty or solid. It is soluble in alcohol, acetone, phenol, glycerine and similar solvents; is soluble in NaOH. Solid A is brittle and melts if heated. All varieties of A, heated long enough under suitable conditions will change first into B, then finally into C."

*B-stage, intermediate condensation product.*—"Is solid at all temperatures. Brittle, but slightly harder than solid A, at ordinary temperatures; insoluble in all solvents but may swell in acetone, phenol, or terpineol without entering into complete solution. If heated, it does not melt, but softens decidedly and becomes elastic and somewhat rubber-like, but on cooling becomes hard again and brittle. Further heating under suitable conditions changes it into C. Although B is infusible, it can be molded under pressure in a hot mold to a homogeneous, coherent mass, and the latter can be further changed into C by the proper application of heat."

*C-stage, final condensation product.*—"Is infusible, insoluble in all solvents; unattacked by acetone; indifferent to ordinary acids, or alkaline solution; is destroyed by boiling in concentrated sulfuric acid, but stands boiling with diluted sulfuric acid; does not soften to any serious extent if heated, stands temperatures of 300° C.; at much higher temperatures begins to be destroyed and chars without entering into fusion; it is a bad conductor of heat and electricity."

The solubility of our resins in acetone and ethanol are tested by preparing a neutral resin and testing the same. In preparing the neutral resin, we neutralize with hydrochloric acid a resin solution to a pH 7; wash with water; filter; and dry the neutralized resin over calcium chloride. Then, the solubility of the neutralized resin is determined by adding the same to ethanol and acetone. The particular resins we tested are those of Examples III and X. In each instance the resins were insoluble in acetone and appeared to swell to a slight degree, leaving a clear supernatant liquid. However, both of the resins were soluble in ethanol forming a dark brown solution. With the above classification of the phenol-aldehyde condensation products before us, it is seen that the ethanol solubility indicates an A-stage resin, while the acetone insolubility indicates a B-stage resin. Therefore, it is feasible to hypothesize that our resins are advanced A-stage resins or incipient B-stage resins.

One of the main uses for this type of resin is in the plywood industry wherein the resinous condensation product is a binder for the wood veneers. Normally, this resin is used in exterior grade plywood, i.e., plywood which is water resistant and meets the commercial standard boil tests, CS45–55. Briefly, this test comprises grooving the faces of a rectangular piece of plywood, 1″ x 3.25″, so as to leave one square inch of glue line to be sheared; immersing the plywood in boiling water for four hours; heating at 145±5° F. for 20 hours; again immersing in boiling water for four hours and shearing while wet. The degree of wood failure, in percent, is estimated. To pass this test the average wood failure must exceed 60%. As is seen from the later to-be-presented Table No. I, plywood prepared from glue-mixes using our resins exceed the specifications of this test.

As a binder for the wood veneers in plywood, this condensation product is not employed entirely by itself but is employed in conjunction with less costly components so as to be extended by the same, thereby making a less costly binder and, consequently, a lower priced plywood. For example, 153 parts of plywood glue mix is prepared from 100 parts by weight of the liquid resin, 15 parts of a filler such as Glufil, Furafil or Silvacon–472, 3 parts of sodium hydroxide, 3 parts of sodium carbonate and 32 parts of water. Glufil is comminuted walnut shells which have been cleaned prior to the conmturation, and is a product of the Agrashell Corporation of Los Angeles, California. Furafil, either "Furafil 100" or "Furafil 100–S," is a product of the Quaker Oats Company and is obtained during the processing of corn cobs to make furfural, an important industrial chemical. In this process the cobs are pressure-cooked with steam and dilute acid, and after the furfural has been distilled the remaining residue, which looks somewhat like ground coffee, is milled to flour fineness. This product, Furafil 100," consists largely of modified cellulose, lignin and resinous materials. In the cooking of the corn cobs there may be used a mineral acid, such as sulfuric or hydrochloric acid. Silvacon–472 is a finely powdered, brown-colored, amorphous material, thermoplastic by nature, and is a product of the Weyerhaeuser Timber Company. This plywood glue mix is spread on wood veneers, the veneers assembled into plywood sheets and the plywood sheets pressed at 175 to 200 pounds per square inch at an elevated temperature of approximately 150° C. for a definite period of time. Upon the completion of the press operation, the surface of the plywood is sanded to a smooth finish and the plywood is cut to size.

As one of the advantages of this invention is the short press time for the high quality of resin bond between the wood veneers in the plywood, a number of the above-identified resins are made into glue-mixes and employed in the making of the plywood and the plywood tested for wood failure so as to more fully bring forth these advantages. The results of these tests are presented in tabular form in Table No. I. In this table, the resins are identified as to their experiment number, the filler or extender, the press time and the percent wood failure. These plywood samples have a glue-mix spread of 57 pounds per thousand square feet of double glue line, are pressed at about 175 pounds per square inch and at approximately 295° F. for the indicated period of time.

TABLE NO. I.—WOOD FAILURE OF PLYWOOD USING GLUE-MIX COMPRISING PHENOL-ALDEHYDE RESIN

| Resin | Extender | Wood Failure (Percent) Press Time (minutes) | | | | Minimum Press Time (minutes) | Assembly Time (minutes) |
|---|---|---|---|---|---|---|---|
| | | 7 | 7.5 | 8 | 8.5 | | |
| II | Glufil | | 87 | 90 | | 8 | |
| II | Furafil | 96 | 92 | 92 | | 7 | |
| III | Glufil | 81 | 91 | 92 | | 7.5 | |
| IV | Furafil | 93 | 96 | | | 7 | |
| V | ...do... | 97 | 95 | 94 | | 7 | |
| VII | ...do... | 88 | 98 | 97 | | 7.5 | |
| VIII | ...do... | | 98 | 98 | | 7.5 | |
| X | ...do... | 96 | 99 | 96 | | 7 | |
| XI | Glufil | | 91 | 95 | | 7.5 | |
| XIV | Silvacon-472 | | | 96 | 97 | 8.0 | |
| XV | ...do... | | 88 | 94 | 92 | 8.0 | |
| XVI | Furafil | 87 | 76 | 90 | | 7.0 | 2 |
| | | 95 | 97 | 94 | | | 8 |
| | | 83 | 90 | 99 | | | 14 |
| | | 94 | 89 | 91 | | | 20 |
| Commercial A | Glufil | 87 | 88 | 81 | | Greater than 8' | |
| Commercial B | Furafil | 77 | 97 | 97 | | 7.5 | |
| Commercial C | Silvacon-472 | | 88 | 94 | 92 | 8.0 | |

From Table No. I it is readily seen that a number of plywood glue-mixes having the above-identified composition are prepared from our resins. The filler for these glue-mixes includes Glufil, Furafil and Silvacon-472. In addition, glue-mixes having phenol-aldehyde resin bases presently used commercially are prepared with the same fillers. It is seen that glue-mixes having our resins and Furafil have a shorter minimum press time than a glue-mix comprising a commercial resin and Furafil. This is brought forth by II, IV, V and X which have a minimum press time of seven minutes, and commercial B having a minimum press time of seven and one-half minutes. Similarly, for glue mixes having our resins and Glufil, the press time is less than for a glue-mix having a commercial resin and Glufil. In particular, see III and XI having a minimum press time of seven and one-half minutes, while commercial A has a press time greater than eight minutes. In regard to the glue-line and the wood failure, it is seen that the glue mixes comprising our resins and Furafil, i.e., II, IV, V, VII, VIII, X and XVI have more wood failure than the glue-mix prepared from commercial B resin and Furafil, thereby indicating a stronger glue. Similarly, the glue-mixes comprising our resins and Glufil, i.e., II, III and XI, have more wood failure than the glue-mix prepared from commercial B resin and Glufil. Also, the glue-mixes of our resins and Silvacon-472, i.e., XIV and XV, have more wood failure than a glue-mix comprising commercial C resin and Silvacon-472. These wood-failure results point out that our resins provide a base for a plywood glue-mix which is superior to presently employed commercial resins both as to a shorter cure time and a stronger glue-line. In regard to resin XVI, it is seen that a glue-mix comprising this resin and Furafil possesses a desirably long assembly time in that a high quality glue-line is attained with an assembly time of twenty minutes.

In addition to use as bases for plywood glue-mixes and as binders for cellulose fibers in wet-strength paper, resins are also usable as binders for wood fibers in hardboard. Briefly, in the dry process for making hardboard, wood chips are introduced into an Asplund defibrator where they are shredded and separated into wood fibers and particles. These fibers are then sorted or classified so as to eliminate those which are too small and too large. The moisture content of the fibers is adjusted to a value in the desired range and mixed with our resin to form a hardboard mixture. Then, the hardboard mixture is laid as a fluffy blanket on a screen. A section of this blanket is then pressed at an elevated temperature and pressure so as to cause the resins to flow around and onto the fibers and also to cure, forming a hard sheet of material known as hardboard.

In addition to its use in the manufacture of plywood and hardboard, our resin is also usable in the manufacture of wet-strength paper. More particularly, in the making of wet-strength paper from an aqueous slurry of cellulose fibers, the resins are added to the slurry in an appropriate place, such as the beater or the head-box, and precipitated onto the fibers by lowering the pH to a value less than 4.5. The pH is lowered by the addition of alum and an acid, such as sulfuric or hydrochloric, to the slurry. In subsequent process steps the slurry is deposited on a screeen or "wire" where a large percentage of the free water runs off and the fibers collect in a mat. This mat is then passed through driers to both remove the excess moisture and also to adjust the moisture contents to a value in the desired range. While in the driers, the resins flow to more uniformly disperse themselves throughout the mat and to also cure and, therefore, bind together the fibers. In certain instances this mat passes through calendering rolls wherein the mat is pressed into a sheet-like form. Because our resin is readily precipitated onto the fibers in the slurry, the pH of the resin solution is above 9.0 so as to maintain the resin in solution, and a lowering of the pH causes resin to precipitate. Because our resin cures rapidly under the application of heat it is desirable for the making of wet-strength paper. More particularly, the latter is of especial importance as the more rapid cure makes it possible to manufacture more wet-strength paper for given heating conditions by using our resin instead of other resins, thereby decreasing the unit cost of the paper.

In the presentation of the examples, the pH of the solutions and mixture is taken with a Beckman pH meter employing a calomel electrode. And, the viscosity of the final resin is taken by the Stormer method and the values converted to centipoises.

Since certain changes may be made in the above process and the condensation product resulting therefrom and different embodiments of the invention can be made without departing from the scope of the invention, it is intended that all matter contained in the above description shall be interpreted as illustrative and not in a limiting sense. More particularly, the polyvalent inorganic alkaline catalyst employed in the induction step may be selected from those compounds of the elements, i.e., beryllium, magnesium, calcium, zinc, cadmium and mercury, of the second series of the Mendeleeff periodic table or periodic classification.

It is also to be understood that the following claims are intended to cover all of the generic and specific features of the invention herein described and all statements of the scope of the invention which, as a matter of language, might be said to fall therebetween.

Having described our invention, what we claim as new and desire to secure by Letters Patent is:

1. In making a phenol-aldehyde condensation product, the process which comprises forming a reaction mixture of about 1 mole of a phenol selected from the group consisting of phenol, 3,5-xylenol, and m-cresol, 1–3 moles of formaldehyde, water, and a difficultly soluble alkaline catalyst of condensation of the phenol with formaldehyde, the catalyst being selected from the group consisting of the oxides and hydroxides of magnesium, calcium, zinc, and beryllium and in proportion to maintain the pH of the mixture at about 5.2–7.6 during the condensation of the phenol with the formaldehyde in contact with the said catalyst, heating the said mixture until the phenol and formaldehyde form a reaction product that is water soluble and the content of free formaldehyde ceases to fall rapidly, then adding an alkali metal hydroxide in the proportion of 0.15–1.15 moles, continuing the heating until a phenol-formaldehyde condensate of increased viscosity is formed that is insoluble in water, soluble in ethanol, and soluble in a solution of the alkali metal hydroxide, and then discontinuing the heating.

2. The process of claim 1, the selected phenol being phenol $C_6H_5OH$.

3. The process of claim 2 which includes distilling water from the said mixture during the heating of the mixture in contact with the said alkaline catalyst of condensation and continuing the distillation and condensation until the temperature rises to about 130° C., then introducing water and cooling the thus diluted product.

4. The process of claim 2, the said alkali metal hydroxide being added in increments during the heating of the mixture therewith and at such rate and in such amount as to maintain the pH during the said heating within the range approximately 9.1–9.3.

5. The process of claim 2, the said alkaline catalyst being calcium hydroxide.

6. In making a phenol-aldehyde condensation product, the process which comprises forming a reaction mixture of about 1 mole of a phenol selected from the group consisting of phenol, 3,5-xylenol, and m-cresol, 1–3 moles of formaldehyde, water and zinc oxide in proportion to maintain the pH of the mixture at about 5.2–7.6 during the condensation of the phenol with the formaldehyde in contact with the said catalyst, heating the said mixture until the phenol and formaldehyde form a reaction product that is water soluble and the content of free formaldehyde ceases to fall rapidly, then adding an alkali metal hydroxide in the proportion of 0.15–1.15 moles, continuing the heating until a phenol-formaldehyde condensate of increased viscosity is formed that is insoluble in water, soluble in ethanol, and soluble in a solution of the alkali metal hydroxide, and then discontinuing the heating.

References Cited in the file of this patent

UNITED STATES PATENTS

| | | |
|---|---|---|
| Re. 23,347 | Redfern | Mar. 20, 1951 |
| 2,360,376 | Van Epps | Oct. 17, 1944 |
| 2,457,493 | Redfern | Dec. 28, 1948 |
| 2,631,097 | Redfern | Mar. 10, 1953 |
| 2,736,718 | Webber | Feb. 28, 1956 |

OTHER REFERENCES

Pauling: "General Chemistry," Freeman & Co., San Francisco, Calif. (1947), p. 381.

Fieser: "Organic Chemistry," 3rd Ed., Reinhold Pub. Co., New York (1956), pp. 210–211.